United States Patent [19]

Plummer

[11] Patent Number: 4,924,759

[45] Date of Patent: May 15, 1990

[54] PRESS-FIT RETAINING RING WITH EXTRUSION-HOLDING CHAMFER FOR WOBBLE-PISTON CUP SEAL

[75] Inventor: Darrill L. Plummer, Charlotte, N.C.

[73] Assignee: Ingersoll-Rand Company, Woodcliff Lake, N.J.

[21] Appl. No.: 226,580

[22] Filed: Aug. 1, 1988

[51] Int. Cl.⁵ .................... F16J 15/34; F16J 15/32
[52] U.S. Cl. .................................. 92/240; 92/245; 277/187; 277/188 R
[58] Field of Search ............... 92/192, 240, 241, 242, 92/243, 244, 245, 246, 247, 257, 258, 259, 98 D; 277/47, 187, 188 R, 188 A

[56] References Cited

U.S. PATENT DOCUMENTS

| | | | |
|---|---|---|---|
| 1,097,563 | 5/1914 | Sowden | 92/240 |
| 1,945,152 | 1/1934 | Marsh | 92/257 X |
| 2,220,993 | 11/1940 | Christenson | 92/240 |
| 2,836,474 | 5/1958 | Mosher | 92/240 |
| 2,926,976 | 3/1960 | Bowerman et al. | 277/188 R X |
| 3,168,301 | 2/1965 | Allinquant | 92/240 X |

FOREIGN PATENT DOCUMENTS

| | | | |
|---|---|---|---|
| 204322 | 4/1939 | Switzerland | 92/240 |
| 789351 | 1/1958 | United Kingdom | 92/240 |

*Primary Examiner*—Robert E. Garrett
*Assistant Examiner*—George Kapsalas
*Attorney, Agent, or Firm*—J. R. Bell; B. J. Murphy

[57] ABSTRACT

A wobble piston apparatus incorporates a cup-type seal seated on a land formed about the head of the piston, and secured by an annular ring. The head of the piston and the ring have chamfered edges which facilitate an engagement of the ring with the piston head, on assembly, and the chamfered edge of the ring further cooperates with the piston to define a void which accommodates therein an extruded expansion of an innermost, peripheral edge of the seal.

8 Claims, 1 Drawing Sheet

PRESS-FIT RETAINING RING WITH EXTRUSION-HOLDING CHAMFER FOR WOBBLE-PISTON CUP SEAL

BACKGROUND OF THE INVENTION

This invention pertains to wobble piston assemblies, such as are employed in inexpensive air compressors and the like, and in particular to an assembly of the aforesaid type in which a seal retaining ring and the piston have surfaces conformed to facilitate their assembly, and cooperative to define a void therebetween in which to accommodate an extruded expansion of an innermost, peripheral edge of a cup-type seal, to enhance a retention of the seal about the piston.

Wobble piston assemblies are well known in the prior art, and commonly they comprise a piston having a cup-type seal fixed thereabout by a retainer of some sort. Typically, the retainer is set upon the seal to secure it against displacement.

SUMMARY OF THE INVENTION

It is an object of this invention to set forth a wobble piston assembly in which the seal retainer not only sets upon the seal to secure it in place, but also cooperates with the piston to define a void into which an innermost, peripheral edge of the seal may extrude and expand, to enhance a retention of the seal, and further has a given surface complementary to a given surface of the piston which facilitates an assembly of the retainer to the piston.

Particularly it is an object of this invention to set forth a wobble piston assembly, comprising a piston; a seal retaining ring; and an annular seal having an innermost, peripheral edge; wherein said piston has a plate-type head, and a rod extending from said head; said head has an annular land formed thereabout; said seal is disposed upon said land; said retaining ring is set upon said seal; said ring has an interference-fit engagement with said wall; and said wall and said ring have means cooperative for (a) facilitating engagement of said ring with said wall, and (b) accommodating an extruded expansion of said innermost, peripheral edge of said seal between said wall and said ring.

Further objects of this invention, as well as the novel features thereof, will become more apparent by reference to the following description taken in conjunction with the accompanying figures, in which:

DETAILED DESCRIPTION OF THE PREFERRED EMBODIMENT

Figures 1, 2:
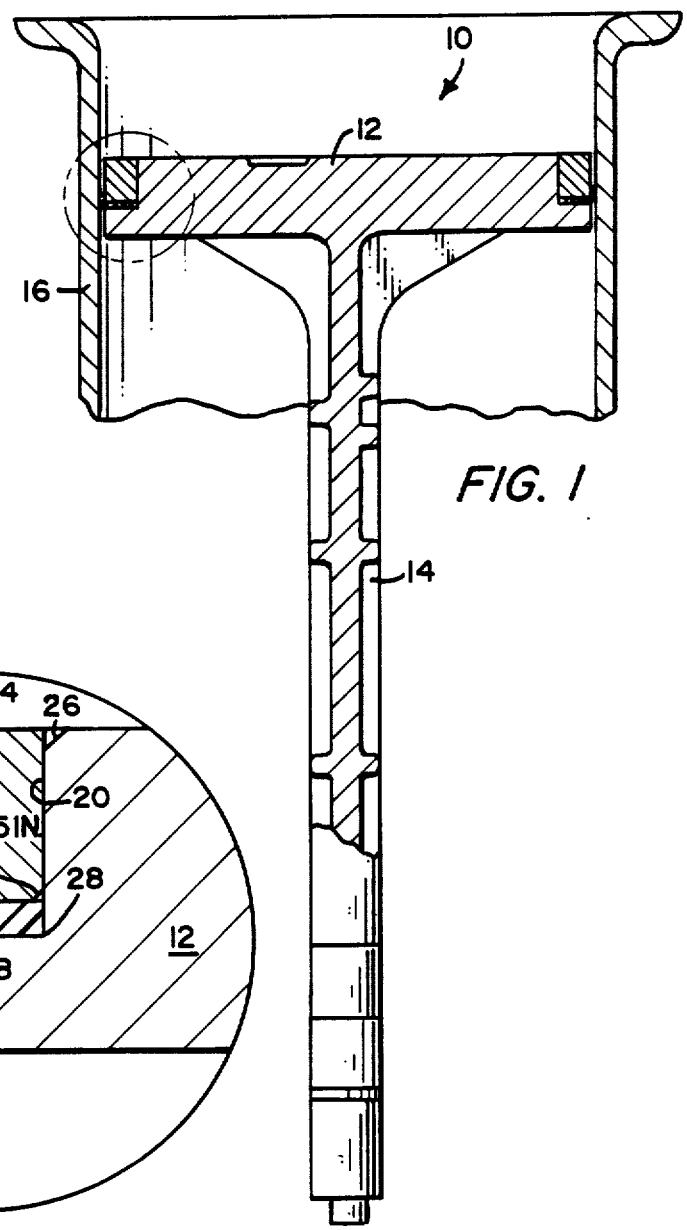
FIG. 1 is a vertical, cross-sectional view of the novel wobble piston assembly, according to an embodiment thereof.
FIG. 2 is an enlarged detail of the circled area in FIG. 1.

As shown in the figures, the wobble piston assembly 10, according to an embodiment thereof, comprises a plate-type piston head 12, which has a rod 14 integral therewith and extending therefrom, reciprocably disposed in a cylinder 16.

The piston head 12 has an annular land 18 formed thereabout, and a circumferential wall 20. A cup-type seal 22 is set upon the land 18, and the lip thereof projects outwardly into sealing engagement with the wall of the cylinder 16.

A seal retaining ring 24 is press-fitted into an interference engagement with the wall 20 and is pressed against the underlying seal 22. The wall 20 has an uppermost portion with a chamfer 26 formed thereon.

The wall 20 and land 18 define a juncture 28, and the ring 24 has a portion, which confronts the juncture; this confronting portion also has a chamfer 30 formed thereon. The chamfers 26 and 30 are provided to facilitate the press-fit engagement of the ring 24 with the wall on assembly. However, the chamfer 30 offers a further, unexpected benefit.

Chamfer 30 cooperates with the piston head 12, and specifically with the juncture of wall 20 and land 18, to define a void thereat into which the innermost edge of the seal 22 can extrude (under the pressure of ring 24, on assembly) and expand. Accordingly, this provisioning enhances the capture of retention of the seal 22.

An outer edge 32 of the ring 24 has a radius of 0.06±0.005 inch to present a gradual and smoothly turned edge to the seal 22 to inhibit untimely failure of the seal, there, where it turns into the sealing lip.

While I have described my invention in connection with a specific embodiment thereof it is to be clearly understood that this is done only by way of example and not as a limitation to the scope of my invention as set forth in the objects thereof and in the appended claims.

I claim:

1. A wobble assembly comprising:
   a piston;
   a seal retaining ring;
   an annular seal having an innermost, peripheral edge;
   said piston has a plate-type head, and a rod extending from said head;
   said head has an annular land formed thereabout;
   said seal is disposed upon said land;
   said retaining ring is set upon said seal;
   said head further has a circumferential wall;
   said ring has an interference-fit engagement with said wall;
   said wall and said ring have means cooperative for (a) facilitating said engagement of said ring with said wall, and (b) accommodating an extruded expansion of said innermost peripheral edge of said seal between said wall and said ring;
   said wall has an uppermost portion;
   said land and wall meet at, and define, a juncture;
   said ring has a portion confronting said juncture;
   said portions area chamfered; and
   said cooperative means of said ring and said wall comprises said chamfered portions.

2. The apparatus defined in claim 1, wherein said head occupies a given plane, in cross-section said ring has a flat side, parallel with said plane, which terminates in a pair of right angular corners, said ring has a radiused edge and said edge of said ring has a radius of between 0.055 and 0.065 inches.

3. The apparatus defined in claim 1, wherein said juncture and said chamfered portion of said ring cooperatively define a void, therebetween, in which to accommodate such an aforesaid extruded expansion of said edge.

4. The apparatus defined in claim 3, wherein said head occupies a given plane, in cross-section said ring has a flat side, parallel with said plane, which terminates in a pair of right-angular corners, said ring has a radiused edge and said edge of said ring has a radius of between 0.055 and 0.065.

5. A wobble piston apparatus, comprising:
- a piston including a head having a circumferential wall, an annular land and a rod extending from said head, said land and wall defining a juncture;
- a seal disposed upon said land, said seal having an innermost peripheral edge;
- a retaining ring set upon said seal, said ring having an interference-fit engagement with said wall; and
- said wall and said ring have chamfered means cooperative for (a) facilitating said engagement of said ring with said wall, and (b) accommodating an extruded expansion of said innermost, peripheral edge of said seal between said wall and said ring.

6. The apparatus defined in claim 5, wherein said head occupies a given plane, in cross-section said ring has a flat side, parallel with said plane, which terminates in a pair of right-angular corners, said ring has a radiused edge and said edge of said ring has a radius of between 0.055 and 0.065 inches.

7. The apparatus defined in claim 5, wherein said juncture and said chamfered portion of said ring define a void, in which to accommodate said extruded expansion of said edge.

8. The apparatus defined in claim 7, wherein said head occupies a given plane, in cross-section said ring has a flat side, parallel with said plane, which terminates in a pair of right angular corners, said ring has a radiused edge and said edge of said ring has a radius of between 0.055 and 0.065 inches.

* * * * *